US009427364B2

(12) United States Patent
Grant et al.

(10) Patent No.: US 9,427,364 B2
(45) Date of Patent: Aug. 30, 2016

(54) ADJUSTABLE LIMB SUPPORT FOR PERSONAL MOBILITY VEHICLES

(71) Applicant: Pride Mobility Products Corporation, Exeter, PA (US)

(72) Inventors: Michael Grant, Exeter, PA (US); John Carminati, Exeter, PA (US); Matthew Tolan, Dunmore, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 0 days.

(21) Appl. No.: 14/199,025

(22) Filed: Mar. 6, 2014

(65) Prior Publication Data

US 2014/0265508 A1 Sep. 18, 2014

Related U.S. Application Data

(60) Provisional application No. 61/779,139, filed on Mar. 13, 2013.

(51) Int. Cl.
*B60N 2/46* (2006.01)
*A61G 5/12* (2006.01)

(52) U.S. Cl.
CPC ........... *A61G 5/12* (2013.01); *A61G 2005/125* (2013.01)

(58) Field of Classification Search
CPC .... A47C 1/03; A47C 1/031; A47C 1/03205; A61G 5/12; B64D 11/0693
USPC ........................... 297/411.37, 411.35, 411.38
See application file for complete search history.

(56) References Cited

U.S. PATENT DOCUMENTS

| | | | | |
|---|---|---|---|---|
| 4,687,167 | A * | 8/1987 | Skalka et al. | 248/126 |
| 6,322,145 | B1 | 11/2001 | Melgarejo | |
| 6,347,771 | B1 * | 2/2002 | Lauzon et al. | 248/118 |
| 6,378,947 | B1 | 4/2002 | Barber | |
| 6,478,274 | B1 * | 11/2002 | Oddsen, Jr. | 248/274.1 |
| 6,619,747 | B2 * | 9/2003 | Ko et al. | 297/423.12 |
| 7,222,826 | B1 * | 5/2007 | Berglund | 248/188.1 |
| 7,677,654 | B2 * | 3/2010 | Enberg et al. | 297/115 |
| 8,469,323 | B1 * | 6/2013 | Deros et al. | 248/278.1 |
| 8,794,579 | B2 * | 8/2014 | Sturman et al. | 248/284.1 |

FOREIGN PATENT DOCUMENTS

| | | | |
|---|---|---|---|
| EP | 1523971 | | 4/2005 |
| GB | 1368134 | A | 8/1974 |
| WO | WO 2014158935 | A1 * | 10/2014 |

* cited by examiner

*Primary Examiner* — Laurie K Cranmer
(74) *Attorney, Agent, or Firm* — Baker & Hostetler, LLP

(57) ABSTRACT

An arm support for a personal mobility vehicle can include a first member having a first end that defines a first cavity, and a first attachment member that extends through the first cavity so as to define an axis. The arm support can further include a second member having a first end that is disposed within the first cavity such that the second member is pivotally attached to the first member by the first attachment member. The arm support can further include an actuator that extends through the first end of the second member and through the first cavity. The actuator can be operatively coupled to the second member such that actuation of the actuator causes the second member to pivot about the axis.

19 Claims, 8 Drawing Sheets

ADJUSTABLE LIMB SUPPORT FOR PERSONAL MOBILITY VEHICLES

CROSS REFERENCE TO RELATED APPLICATIONS

This application claims the benefit of U.S. Provisional Application Ser. No. 61/779,139, filed Mar. 13, 2013, the contents of which are hereby incorporated by reference as if set forth in their entirety herein.

BACKGROUND

Certain wheelchairs typically include arm supports that are attached to the seats of the wheelchairs. The arm supports can be adjustable to accommodate different size occupants and the different comfort desires of each occupant. The known arm supports typically have a finite number of positions at which the arm supports can be adjusted to. Further, to adjust the arm supports, pins or bolts have to be removed prior to allow the arm supports to be moved to each position.

SUMMARY

In an embodiment, an arm support for a wheelchair can include a first member having a first end and a second end spaced from the first end along a first direction, the first end defining a first cavity, and the first member including a first attachment member that extends through the first cavity so as to define an axis that extends along a second direction that is substantially perpendicular to the first direction. The arm support can further include a second member having a first end and a second end spaced from the first end along the first direction, the first end of the second member being disposed within the first cavity such that the second member is pivotally attached to the first member by the first attachment member. The arm support can further include an actuator that extends through the first end of the second member and through the first cavity along a third direction that is substantially perpendicular to at least the second direction, the actuator being operatively coupled to the second member such that actuation of the actuator causes the second member to pivot about the axis.

In accordance with another embodiment, an arm support for a wheelchair can include a first member having a first end and including a first attachment member that extends through the first end so as to define an axis that extends along a transverse direction; a second member having a first end that defines a first pair of plates that are spaced from each other along the transverse direction, at least one plate of the first pair of plates including a slot that is elongate along a longitudinal direction that is perpendicular to the transverse direction, the second member further including a nut having at least one engagement member that engages the slot of the at least one plate to thereby pivotally couple the nut between the plates of the first pair of plates, wherein the first attachment member extends through the first pair of plates to thereby pivotally attach the second member to the first member; and an actuator that extends through the first cavity and through the nut, whereby rotation of the actuator moves the nut along the actuator and along the slot to thereby cause the second member to pivot about the axis.

In accordance with another embodiment, a method of adjusting an arm support for a wheelchair, can include the steps of rotating a first actuator to thereby cause an upper arm portion of the arm support to pivot about a first vertical axis relative to a shoulder of the arm support; and rotating a second actuator to thereby cause an arm support of the arm support to pivot about a second vertical axis relative to the upper arm portion.

BRIEF DESCRIPTION OF THE DRAWINGS

The foregoing summary, as well as the following detailed description of embodiments of the application, will be better understood when read in conjunction with the appended drawings. For the purposes of illustrating the methods, adjustable limb support, and systems of the present application, there is shown in the drawings a preferred embodiment. It should be understood, however, that the application is not limited to the precise methods, adjustable limb support, and systems shown. In the drawings.

DETAILED DESCRIPTION

Figure 1:
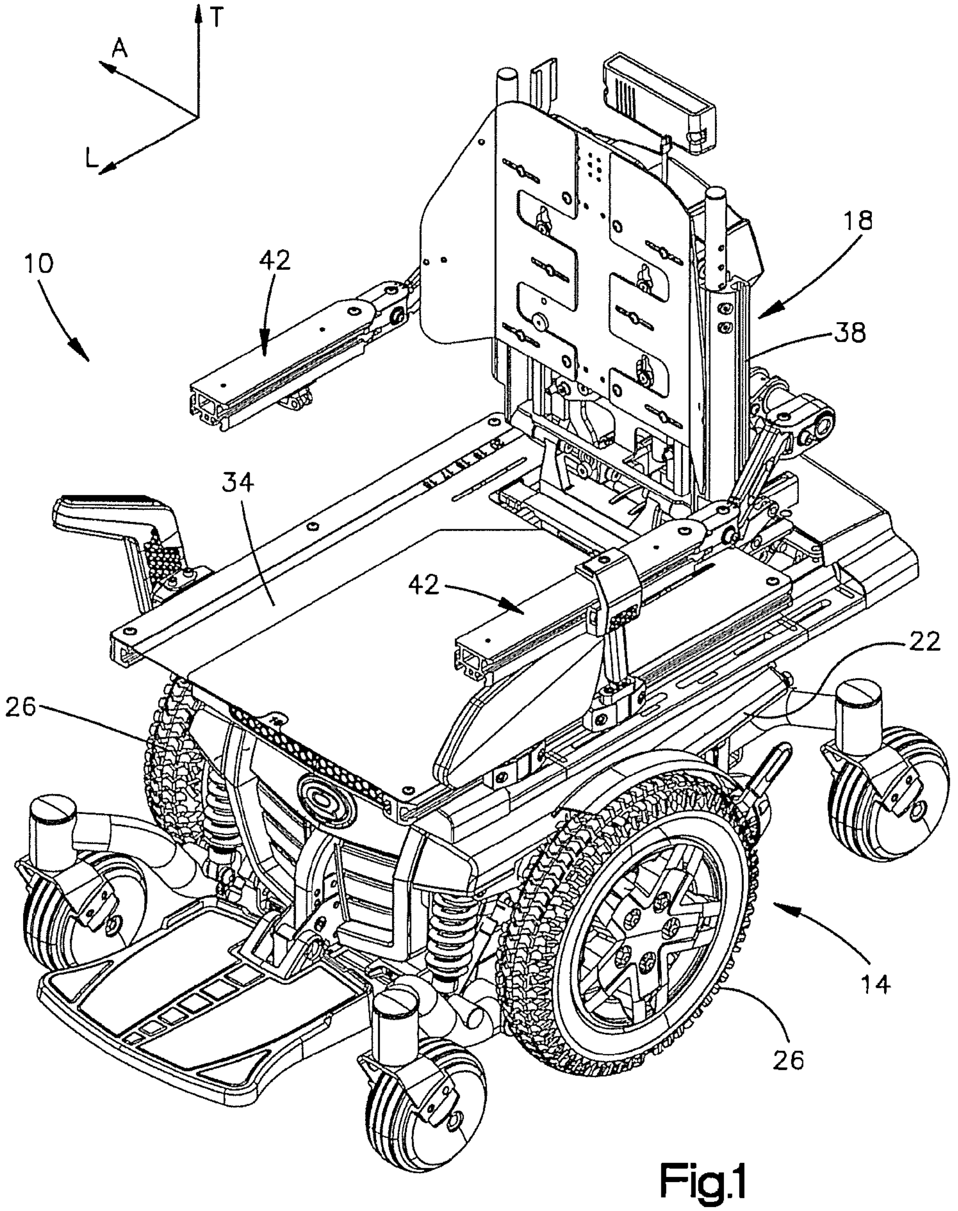
FIG. 1 is a perspective view of a wheelchair in accordance with an embodiment, the wheelchair having a seating system that includes a seat bottom, a seat back, and a pair of adjustable arm supports coupled to opposed sides of the seat back, certain components of the wheelchair have been removed for clarity.

Referring to FIG. 1, a personal mobility vehicle, such as a wheelchair 10, can include a base 14, and a seating system 18 attached to the base 14. The base 14 can include a frame 22, a pair of drive wheels 26 coupled to the frame 22, and a pair of drives operatively coupled to the drive wheels 26 such that the drives cause the wheels to rotate to thereby propel the wheelchair 10 in a desired direction. The seating system 18 can include a seat base 34, a seat back 38, and a pair of adjustable arm supports 42 that are coupled to opposed sides of the seat back 38. The adjustable arm supports 42 are configured to be easily adjusted to desired positions so as to accommodate different individuals. It should be appreciated, that the mechanisms disclosed can be incorporated into other portions of the wheelchair 10 and that the personal mobility vehicle can have other configurations. For example, the mechanisms that allow the adjustable arm supports 42 to be easily adjusted can be incorporated into leg supports of the wheelchair and the personal mobility vehicle can be configured as a scooter, as desired.

Certain terminology is used in the following description for convenience only and is not limiting. The words “right”, “left”, “lower” and “upper” designate directions in the drawings to which reference is made. The words “inner” or “distal” and “outer” or “proximal” refer to directions toward and away from, respectively, the geometric center of the implant and related parts thereof. The terminology includes the above-listed words, derivatives thereof and words of similar import.

Figure 2A:
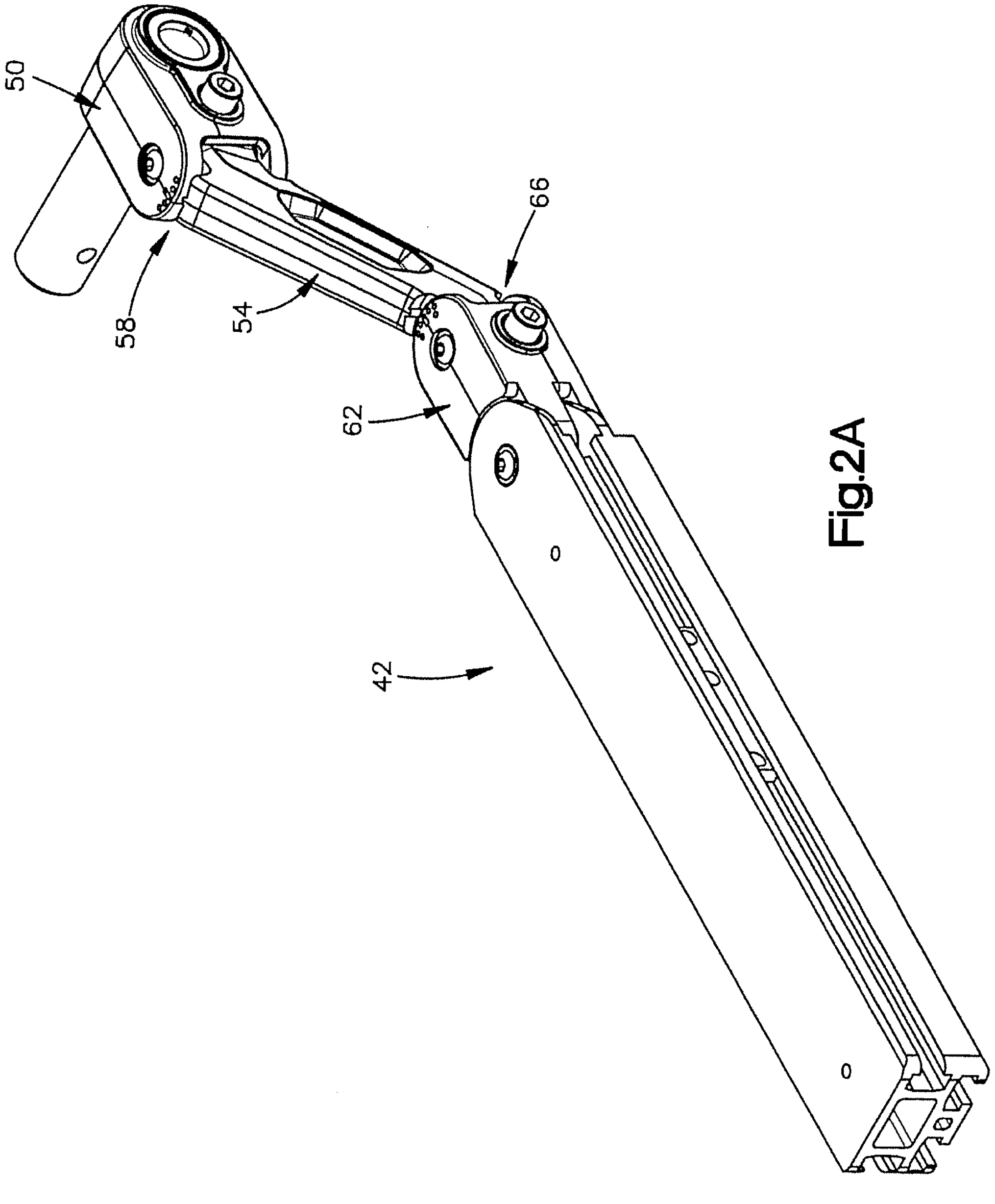
FIG. 2A is a perspective of an adjustable arm support in accordance with an embodiment, the adjustable arm support including a first member, a second member pivotably coupled to the first member at a first joint, and a third member pivotably coupled to the second member at a second joint.

The adjustable arm supports 42 are substantially identical. Therefore it should be appreciated, that while a first arm support 42 of the pair of adjustable arm supports 42 will be described, the second arm support 42 will include substantially similar components as the first arm support 42 and will operate in a substantially similar manner. Referring to FIG. 2A, the adjustable arm support 42 is described herein as extending horizontally along a longitudinal direction “L” and lateral direction “A”, and vertically along a transverse direction “T”. Unless otherwise specified herein, the terms “lateral,” “longitudinal,” and “transverse” are used to describe the orthogonal directional components of various components. It should be appreciated, however, that the directional components of the various components of the adjustable arm support 42 will vary during use. For instance, while the longitudinal directional components of each component of the arm support 42 are parallel to each other in FIG. 2A, when the arm support 42 is adjusted, the longitudinal directional component of one component of the arm support 42 may be angularly offset from that of a second component of the arm support 42.

Figure 2B:
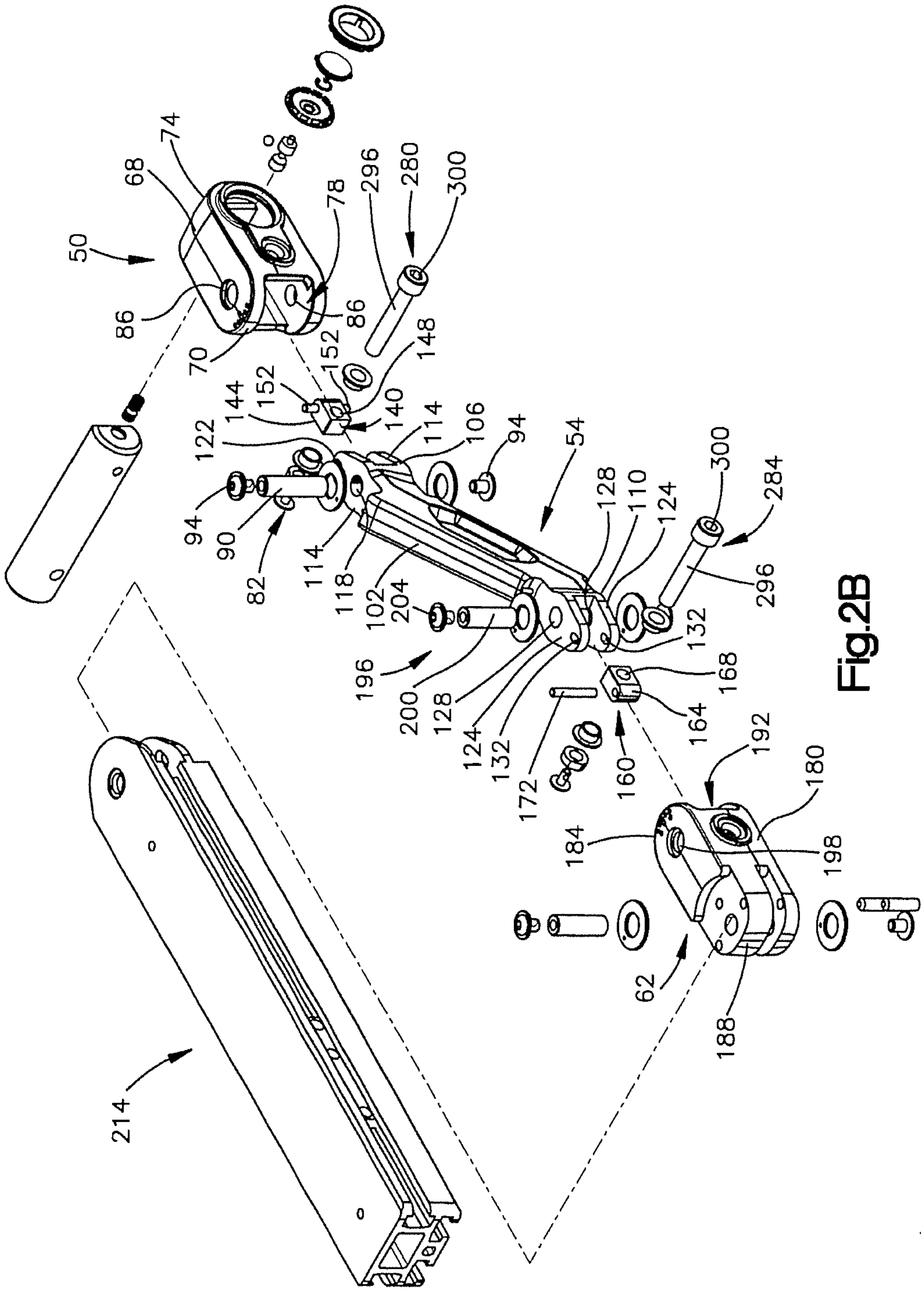
FIG. 2B is an exploded view of the adjustable arm support shown in FIG. 2A.

As shown in FIGS. 2A and 2B, the adjustable arm support 42 includes a first member 50, a second member 54 pivotally coupled to the first member 50 at a first joint 58, and a third member 62 pivotally coupled to the second member 54 at a second joint 66. The first member 50 can be configured as a shoulder that is coupled to the seat back 38, the second member 54 can be configured as an upper arm portion, and the third member 62 can be configured to support an arm rest. It should be appreciated, however, that the first, second, and third members can be any portion of the adjustable arm support 42 unless otherwise claimed. For example, in an embodiment where the adjustable arm support 42 includes a single adjustable portion, the upper arm portion may be considered the first member and the portion that supports the arm rest may be considered the second member or vice versa. Further, it should be appreciated, that the seat back 38 not only includes the portion that an individual rests against but also includes any structure that is supported by that portion.

As shown in FIG. 2B, the first member 50 includes a body 68 that is elongate along a first direction, such as along the longitudinal direction. The body 68 can define a first end 70 and a second end 74 spaced from the first end 70 along the first direction. The first end 70 defines a first cavity 78 that extends into the body 68 along the first direction. The first member 50 can further include a first attachment member 82 that extends through the first cavity 78 so as to define an axis $A_1$ that extends along a second direction that is substantially perpendicular to the first direction, such as along the transverse direction. In particular, the first member 50 can define a pair of bores 86 that are configured to receive the first attachment member 82 to thereby secure the first attachment member 82 to the body 68.

The first attachment member 82 can include a substantially cylindrical body 90 that is elongate along the second direction and a pair of fasteners 94 that are configured to be coupled to opposed ends of the body 90 to thereby trap or otherwise couple the body 90 to the first member 50. As shown, the cylindrical body 90 is configured to be received by the bores 86 and the fasteners 94 have a dimension that is greater than that of the bores 86 such that when the fasteners 94 are coupled to the body 90, the body 90 will be trapped within the bores 86. It should be appreciated, however, that the first attachment member 82 can have any configuration as desired. For example, the first attachment member 82 can be configured as a standard bolt, as desired.

With continued reference to FIGS. 2A and 2B, the second member 54 can include an angled body member 102 that defines a first end 106 and a second end 110 that is spaced from the first end along the first direction. The angled body member 102 extends between the first and second ends 106 and 110 such that the second end 110 of the second member 54 is offset from the first end 106 of the second member 54 along the second direction. The first end 106 of the second member is configured to be disposed within the first cavity 78 such that the second member is pivotally attached to the first member 50 by the first attachment member 82. It should be appreciated, that while the second member 54 includes an angled body member 102 in the illustrated embodiment, the second member 54 can be substantially straight such that the first and second ends 106 and 110 are not offset from each other along the second direction.

As shown in FIG. 2B, the first end 106 includes a first pair of plates 114 that are spaced from each other along the second direction. Each plate 114 defines a respective bore 118 such that when the plates 114 are received within the first cavity 78 the bores 118 align with the bores 86 and the first attachment member 82 extends through the bores 86 and 118 along the second direction to thereby pivotally couple the second member 54 to the first member 50. As shown in FIG. 2B, each plate 114 further defines a slot 122 that is elongate along the first direction. As illustrated, each slot 122 can be rearward from the respective bore 118 and can be aligned with the respective bore 118 along the first direction. It should be appreciated, however, that the first end 106 can have any configuration as desired. For example, one of the plates 114 can define a slot 122 while the other plate is void of the slot 122 as desired.

Similarly, the second end 110 includes a second pair of plates 124 that are spaced from each other along the second direction. Each plate 124 defines a respective bore 128 and a respective slot 132 that is elongate along the first direction. As illustrated each slot 132 can be forward of the respective bore 128 and can be aligned with the respective bore 128 along the first direction. It should be appreciated, however, that the second end 110 can have any configuration as desired. For example, one of the plates 124 can define a slot 132 while the other plate is void of the slot 132 as desired.

With continued reference to FIG. 2B, the second member 54 further includes a first nut 140 that is pivotally and translatably coupled between the first pair of plates 114. The nut 140 includes a nut body 144 that defines an aperture 148 that extends through the body 144 along a third direction that is perpendicular to at least the second direction, such as along the lateral direction. The aperture 148 carries an internal thread that is configured to mate with an external thread of an actuator such that rotation of the actuator causes the nut 140 to move along the actuator along the third direction. The nut 140 further includes a pair of engagement members 152 that extend from the nut body 144 along the second direction such that each engagement member 152 extends into a respective slot 122 of the first pair of plates 114 to thereby pivotally and slidably couple the nut 140 to the plates 114. As illustrated, the engagement members 152 can be ends of a single rod that extends through the nut body 144 along the second direction. It should be appreciated, however, that the engagement members 152 can be separate members that extend from the body 144 in opposite directions and are monolithic with the nut body 144. The engagement members 152 can have a dimension that is substantially equal to the width of the slots 122. Therefore, in the illustrated embodiment, the nut 140 can only move along that first direction, and will be substantially translatably fixed in all other directions.

In the illustrated embodiment the nut body 144 is elongate along the first direction and the aperture 148 is disposed forward relative to the engagement members 152. The nut body 144 is pivotable relative to the first end 106 and can move or otherwise translate relative to the first end 106 along the first direction. It should be appreciate, however, that the nut 140 can have any configuration as desired.

As shown in FIG. 2B, the second member 54 further includes a second nut 160 that is pivotally and translatably coupled between the second pair of plates 124. The nut 160 includes a nut body 164 that defines an aperture 168 that extends through the body 164 along the third direction. The aperture 168 carries an internal thread that is configured to mate with an external thread of an actuator such that rotation of the actuator causes the nut 160 to move along the actuator along the third direction. The nut 160 further includes a pair of engagement members 172 that extend from the nut body 164 along the second direction such that each engagement member 172 extends into a respective slot 132 of the second pair of plates 124. As illustrated, the engagement members 172 can be ends of a single rod that extends through the nut body 164 along the second direction. It should be appreciated, however, that the engagement members can be separate members that extend from the body 164 in opposite directions and are monolithic with the nut body 164. The engagement members 172 can have a dimension that is substantially equal to the width of the slots 132. Therefore, the nut 160 can only move along that first direction, and will be substantially translatably fixed in all other directions.

In the illustrated embodiment the nut body 164 is elongate along the first direction and the aperture 168 is disposed rearward relative to the engagement members 172. The nut body 164 is pivotable relative to the second end 110 and can move or otherwise translate relative the second end 110 along the first direction.

With continued reference to FIG. 2B, the third member 62 includes a body 180 that is elongate along the first direction The body 180 can define a first end 184 and a second end 188 spaced from the first end 184 along the first direction. The first end 184 defines a second cavity 192 that extends into the body 180 along the first direction. The third member 62 can further include a second attachment member 196 that extends through the second cavity 192 so as to define an axis $A_2$ that extends along the second direction. In particular, the third member 62 can define a pair of bores 198 that are configured to receive the second attachment member 196 to thereby secure the second attachment member 196 to the body 180.

The second attachment member 196 can include a substantially cylindrical body 200 that is elongate along the second direction, and a pair of fasteners 204 that are configured to be coupled to opposed ends of the body 200 to thereby trap or otherwise couple the body 200 to the third member 62. As shown, the cylindrical body 200 is configured to be received by the bores 198 and the fasteners 204 have a dimension that is greater than that of the bores 198 such that when the fasteners 204 are coupled to the body 200, the body 200 will be trapped within the bores 198. It should be appreciated, however, that the second attachment member 196 can have any configuration as desired. For example, the second attachment member 196 can be configured as a standard bolt.

As shown in FIGS. 2A and 2B, the adjustable arm support 42 can further include an arm rest 214 that is supported by the second end 188 of the third member 62. The arm rest 214 is elongate along the first direction and is configured to support an infirmed persons arms in a comfortable position.

As shown in FIGS. 2A and 2B, the adjustable arm support 42 can further include a first actuator 280 that extends through the first end 106 of the second member 54 and through the first cavity 78 along the third direction, and a second actuator 284 that extends through the second end 110 of the second member 54 and through the second cavity 192 along the third direction. The first actuator 280 can be operatively coupled to the second member 54 such that actuation of the first actuator 280 causes the second member 54 to pivot about the axis $A_1$ and the second actuator 284 can be operatively coupled to the second member 54 such that actuation of the second actuator 284 causes the third member 62 to pivot about the axis $A_2$.

The first and second actuators 280 and 284 can be configured as respective bolts 296 that define external threads configured to mate with the internal threads of the first and second nuts 140 and 160, respectively. Each bolt 296 can define a mating interface 300 that is configured to receive a tool such as a wrench. When the wrench is engaged with one of the mating interfaces 300, rotation of the wrench will cause the bolt 296 to rotate thereby causing the nut to travel along the bolt 296. It should be appreciated, however, that the first and second actuators 280 and 284 can have other configurations as desired. For example, the first and second actuators 280 and 284 can be a worm drive with a mating worm gear.

Figure 3A:
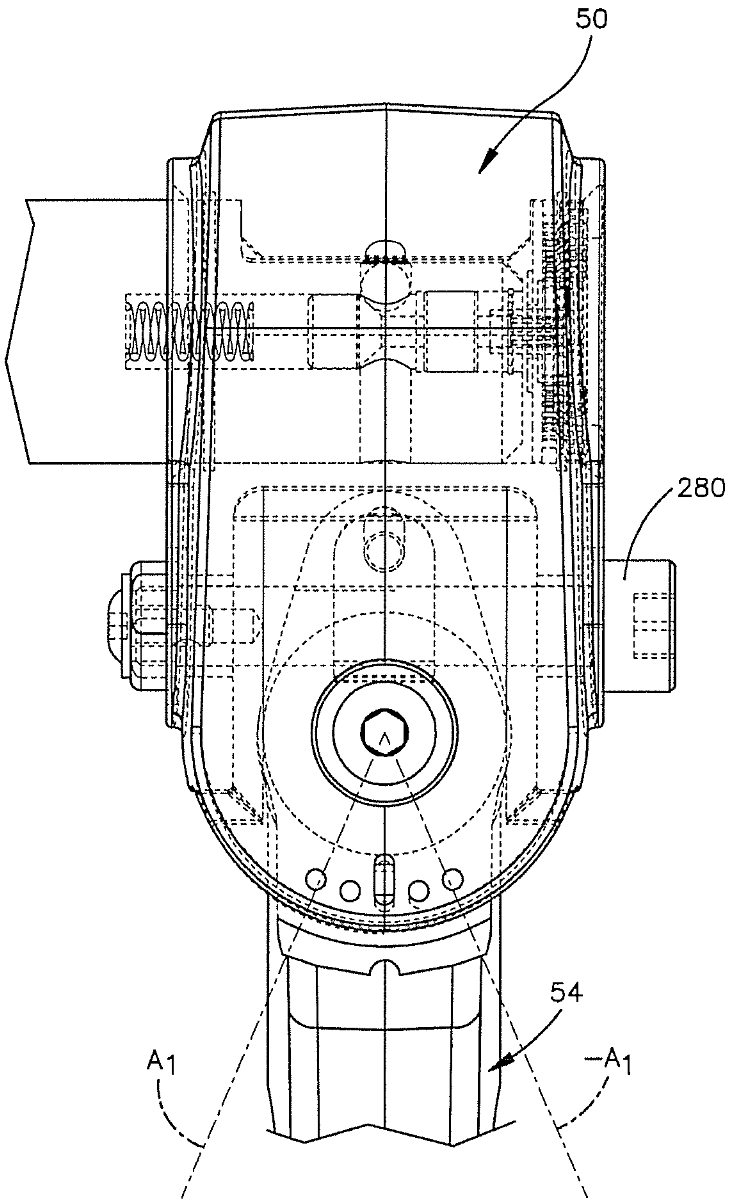
FIG. 3A is a top plan view of the first joint showing the angular range through which the second member can pivot relative to the first member.
Figure 3B:
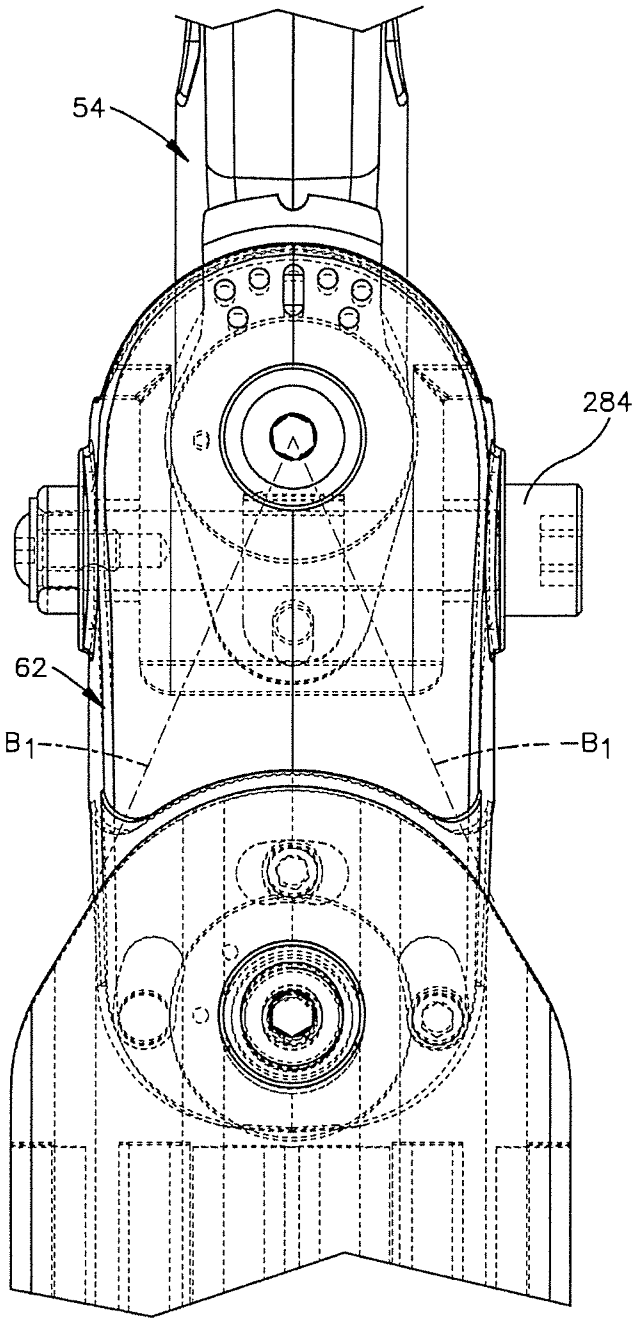
FIG. 3B is a top plan view of the second joint showing the angular range through which the third member can pivot relative to the first member.

Now in reference to FIGS. 3A-3B, the third member 62 may be adjusted relative to the second member 54 by rotating the second actuator 284. It should be appreciated, that the second member 54 can also be rotated relative to the first member 50 in a similar manner if it is desired to adjust the angular position of the second member 54. As shown in FIG. 3A, the second member 54 can be adjusted relative to the first member 50 to any desired angle $\theta_1$ within a specified angular range that is between about $-A_1$ and about $A_1$. For example, the second member can be adjusted relative to the first member 50 to any desired angle $\theta_1$ that is between about −25° and about 25° relative to the longitudinal direction of the first member 50. Similarly, and as illustrated in FIG. 3B, the third member 62 can be adjusted relative to the second member 54 to any desired angle $\theta_2$ within a specified angular range that is between about $-B_1$ and about $B_1$. For example, the third member can be adjusted relative to the second member 54 to any desired angle $\theta_2$ that is between about −25° and about 25° relative to the longitudinal direction of the second member 54. That is, rotation of the actuators 280 and 284 will cause the second member 54 or third member 62 to pivot to any desired angle within the specified angular range. It should be appreciated, however, that the desired ranges can be any ranges as desired.

Figure 4A:
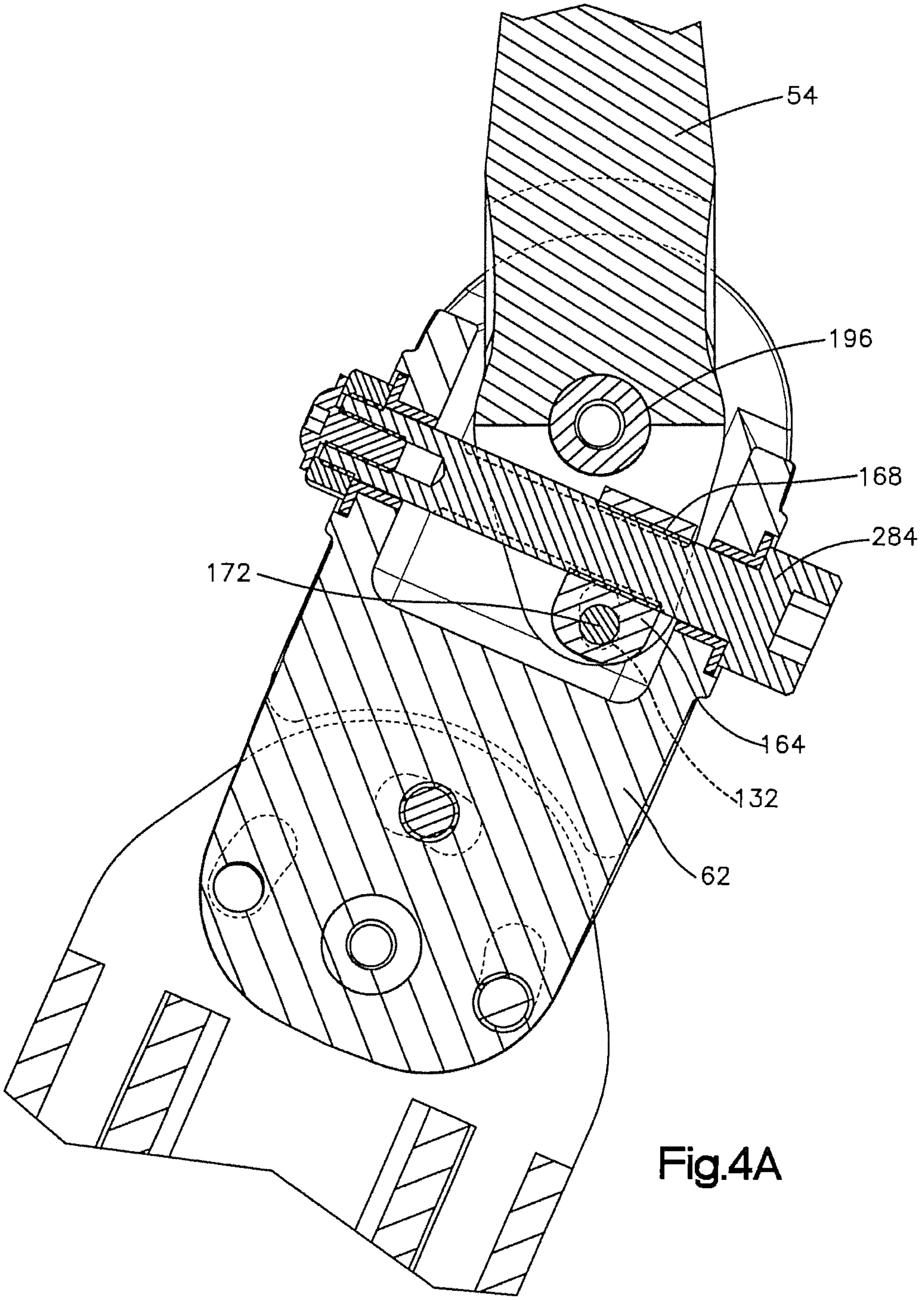
FIG. 4A is a cross-sectional view of the second joint shown in FIG. 3B, the third member being in a first position relative to the second member.
Figure 4B:
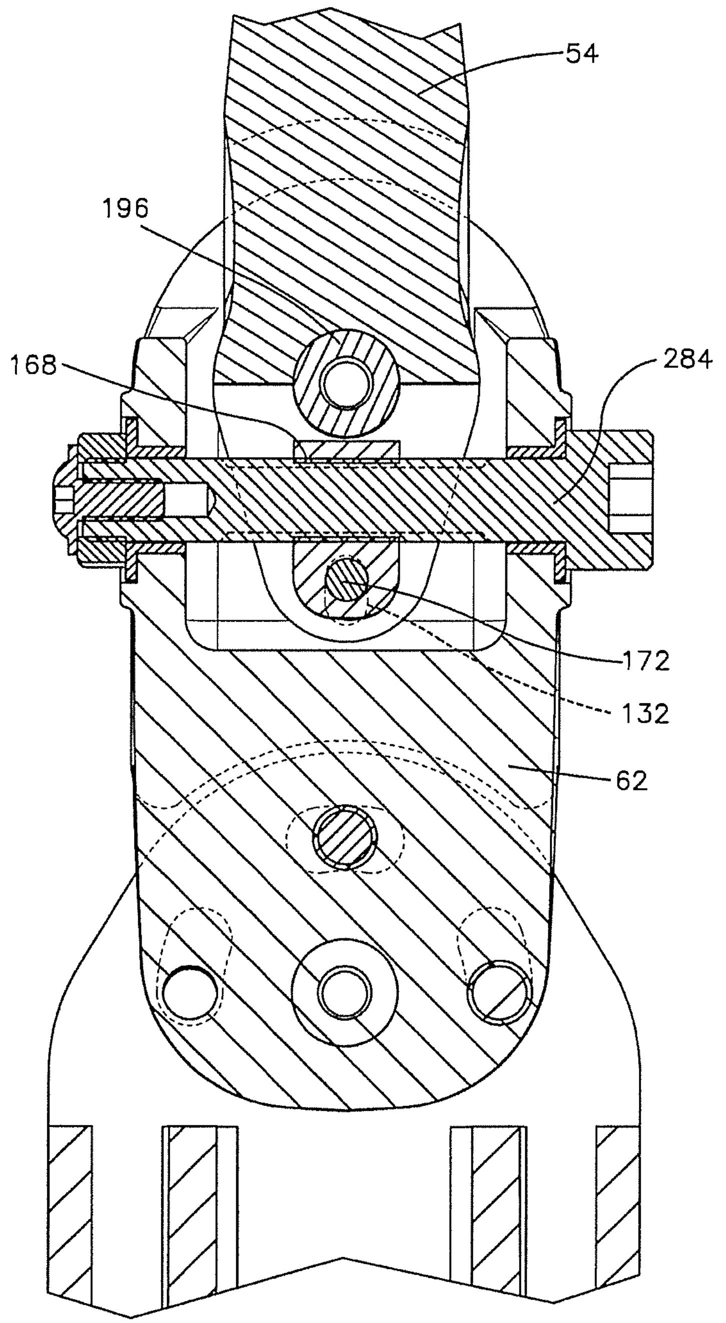
FIG. 4B is a cross-sectional view of the second joint shown in FIG. 3B, the third member being in a second position relative to the second member.
Figure 4C:
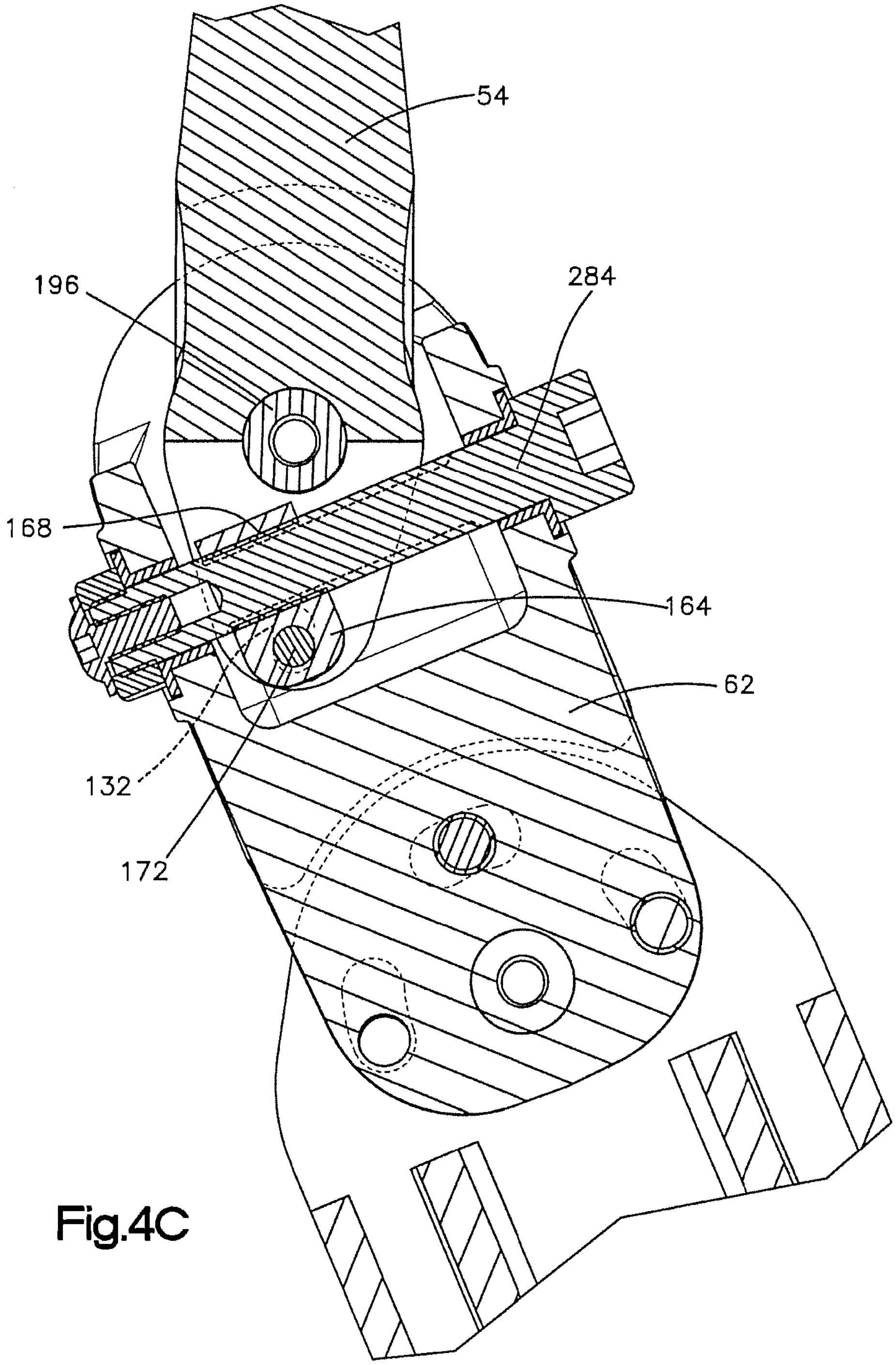
FIG. 4C is a cross-sectional view of the second joint shown in FIG. 3B, the third member being in a third position relative to the second member.

In operation and as shown in FIGS. 4A-4C, the angular position of the third member 62 can be adjusted by rotating the second actuator 284. As shown in FIG. 4A, when the third member 62 is in a first angular position, for example at $-B_1$, the engagement members 172 of the nut 160 will be disposed in a first or forward portion of the slots 132 and the nut 160 will be positioned proximate to a first end of the actuator 284. As shown in FIG. 4B, as the second actuator 284 is rotated, the nut 160 will move along the second actuator 284 toward the middle of the actuator 284 while the engagement members 172 move toward a second or rearward portion of the slots 132. In FIG. 4B, the third member 62 is shown in a second position whereby by the angular position of the third member 62 is 0°. As shown in FIG. 4C, the third member 62 can be moved toward a third angular position, for example at $B_1$. In such a position, the engagement members 172 of the nut 160 will once again be disposed in the first or forward portion of the slots 132 and the nut 160 will be positioned proximate to a second end of the actuator 284. Because the nut 160 is able to pivot and translate relative to the second member 54, the nut 160 is able to move along the second actuator 284 when the actuator 284 is rotated to thereby cause the third member 62 to pivot relative to the second member 54.

The second member 54 can be adjusted in a similar manner as the third member 62. Depending on the position of the first nut 140, however, the engagement members 152 of the first nut 140 may be in a rearward portion of the slots 122 when the second member 54 is at an angular position of 0° relative to the first member 50.

While the foregoing description and drawings represent the preferred embodiments of the present invention, it will be understood that various additions, modifications, combinations and/or substitutions may be made therein without departing from the spirit and scope of the invention as defined in the accompanying claims. In particular, it will be clear to those skilled in the art that the invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components, which are particularly adapted to specific environments and operative requirements without departing from the principles of the invention. In addition, features described herein may be used singularly or in combination with other features. For example, features described in connection with one embodiment may be used and/or interchanged with features described in another embodiment. The presently disclosed embodiments are therefore to be considered in all respects as illustrative and not restrictive, the scope of the invention being indicated by the appended claims, and not limited to the foregoing description.

It will be appreciated by those skilled in the art that various modifications and alterations of the invention can be made without departing from the broad scope of the appended claims. Some of these have been discussed above and others will be apparent to those skilled in the art.

What is claimed:

1. An arm support for a wheelchair, the arm support comprising:

a first support member including a first end and a second end spaced from the first end along a respective first direction, the first end defining a first cavity, and the first support member further including a first attachment member that extends through the first cavity so as to define an axis that extends along a second direction that is substantially perpendicular to the first direction;

a second support member having a first end and a second end spaced from the first end along a respective first direction, the second support member including an angled body member that extends between first and second ends of the second support member such that the second member is offset with respect to the first member along the second direction, the first end of the second support member being disposed within the first cavity such that the second support member is pivotally attached to the first support member by the first attachment member; and an actuator that extends through the first end of the second support member and through the first cavity along a third direction that is substantially perpendicular to at least the second direction, the actuator being operatively coupled to the second support member such that actuation of the actuator causes the second support member to pivot about the axis.

2. The arm support of claim 1, wherein the first end of the second support member includes a pair of plates that are spaced from each other along the second direction.

3. The arm support of claim 2, wherein the first attachment member extends through the pair of plates along the second direction.

4. The arm support of claim 2, wherein the second support member further includes a nut that is pivotally coupled between the pair of plates, the nut including aperture that carries a thread, the actuator defining a bolt that carries a thread that mates with the thread of the nut such that rotation of the bolt causes the nut to move along the bolt along the third direction.

5. The arm support of claim 4, wherein each plate of the pair of plates defines a slot that is elongate along the first direction, and wherein the nut includes a body that defines the aperture, and the nut further includes a pair of engagement members that extend from the body along the second direction such that each engagement member extends into a respective slot of the pair of plates.

6. The arm support of claim 5, wherein the nut moves along the first direction relative to the second member as the nut moves along the bolt.

7. The arm support of claim 1, wherein the first support member is a shoulder support member that is coupled to a wheelchair seat back and the second support member is an upper arm support portion that includes an angled body member that extends between the first and second ends such that the second end of the upper arm support portion is offset from the first end of the upper arm support portion along the second direction.

8. The arm support of claim 7, further comprising a third support member having a first end and a second end spaced from the first end along the first direction, the first end of the third support member defining a second cavity, and the third support member including a second attachment member that extends through the second cavity so as to define an axis that extends along the second direction, wherein the second end of the second support member is disposed within the second cavity such that the second support member is pivotally attached to the third support member by the second attachment member.

9. The arm support of claim 8, wherein the actuator is a first actuator, and the arm support further comprises a second actuator that extends through the second end of the second support member and through the second cavity, the second actuator being operatively coupled to the second support member such that actuation of the second actuator causes the third support member to pivot about the axis of the second attachment member.

10. The arm support of claim 9, further comprising an arm rest that is supported by the second end of the third member.

11. The arm support of claim 1, wherein the first end extends along a plane that is aligned with the respective first direction, and the second end is offset with respect to the first end along the second direction with respect to the plane.

12. An arm support for a wheelchair, the arm support comprising:

a first support member having a first end and including a first attachment member that extends through the first end so as to define an axis that extends along a transverse direction;

a second support member having a first end that defines a first pair of plates that are spaced from each other along the transverse direction, at least one plate of the first pair of plates including a slot that is elongate along a longitudinal direction that is perpendicular to the transverse direction, the second member further including a nut having at least one engagement member that engages the slot of the at least one plate to thereby pivotally couple the nut between the plates of the first pair of plates, wherein the first attachment member extends through the first pair of plates to thereby pivotally attach the second member to the first member; and an actuator that extends through the first cavity and through the nut, whereby rotation of the actuator moves the nut along the actuator and along the slot to thereby cause the second support member to pivot about the axis.

13. The arm support of claim 12, wherein the first end of the first support member defines a first cavity that receives the first pair of plates.

14. The arm support of claim 13, wherein the second support member has a second end, and the arm support further comprises a third support member having a first end that defines a second cavity that receives the second end of the second support member, the third support member including a second attachment member that extends through the second cavity and through the second end so as to define an axis that extends along the transverse direction about which the third support member pivots relative to the second support member.

15. The arm support of claim 14, wherein the second end defines a second pair of plates that are spaced from each other along the transverse direction, at least one plate of the second pair of plates including an elongate slot.

16. The arm support of claim 15, wherein the second support member further includes a second nut having at least one engagement member that engages the slot of the at least one plate of the second pair of plates to thereby pivotally couple the second nut between the plates of the second pair of plates, wherein the second attachment member extends through the second pair of plates to thereby pivotally attach the third support member to the second support member.

17. The arm support of claim 16, further comprising a second actuator that extends through the second cavity and through the second nut, whereby rotation of the second actuator moves the nut along the second actuator and along the slot of the at least one plate of the second pair of plates to thereby cause the third support member to pivot about the axis defined by the second attachment member.

18. The arm support of claim 14, wherein the first support member is a shoulder support member that is coupled to a wheelchair seat back and the second support member is an upper arm support portion that includes an angled body member such that the second end of the upper arm support portion is offset from the first end of the upper arm support portion along the transverse direction.

19. The arm support of claim 18, further comprising an arm rest that is supported by the third support member.

* * * * *